United States Patent [19]

Kleinwächter

[11] Patent Number: 4,686,960
[45] Date of Patent: Aug. 18, 1987

[54] APPARATUS FOR HEATING WATER BY SOLAR ENERGY

[75] Inventor: Jürgen Kleinwächter, Kandern, Fed. Rep. of Germany

[73] Assignee: Bomin Solar GmbH & Co. KG, Lörrach, Fed. Rep. of Germany

[21] Appl. No.: 803,306

[22] Filed: Nov. 29, 1985

[51] Int. Cl.$^4$ ................................................ F24J 3/02
[52] U.S. Cl. .................................... 126/422; 126/426; 126/444; 126/450
[58] Field of Search ............... 126/419, 422, 423, 426, 126/416, 444, 450

[56] References Cited

U.S. PATENT DOCUMENTS

| 3,052,228 | 9/1962 | Okuda | 126/426 |
| 3,598,104 | 8/1971 | Trostler | 126/415 |
| 3,908,631 | 9/1975 | Rom | 126/426 |
| 4,343,298 | 8/1982 | Ambille et al. | 126/450 |
| 4,392,481 | 7/1983 | Moore | 126/426 X |
| 4,436,085 | 3/1984 | Larsen | 126/450 |
| 4,485,804 | 12/1984 | Sharpe | 126/450 X |

FOREIGN PATENT DOCUMENTS 2408866 7/1979 France ................................ 126/422

Primary Examiner—Margaret A. Focarino
Attorney, Agent, or Firm—Browdy and Neimark

[57] ABSTRACT

The invention relates to an apparatus for heating water by solar energy, including a container made from a plastic film or sheeting for the water to be supplied to consumers, having a cold water inlet opening preceded by an inlet valve and having a withdrawal opening, wherein the top of the container is transparent and the bottom is dark in color. To further develop a known apparatus of this type such that water can be withdrawn even for relatively large-scale needs and it can be connected to an installed water system, it is provided that the outlet opening is followed by a pump and a check valve, that the inlet valve is electromagnetically actuatable, and that a sensor for measuring the instantaneous water temperature and an adjusting device for adjusting the desired temperature of the water to be supplied are connected to the inlet valve. The higher the instantaneous water temperature, the more cold water the inlet valve admits into the container.

15 Claims, 13 Drawing Figures

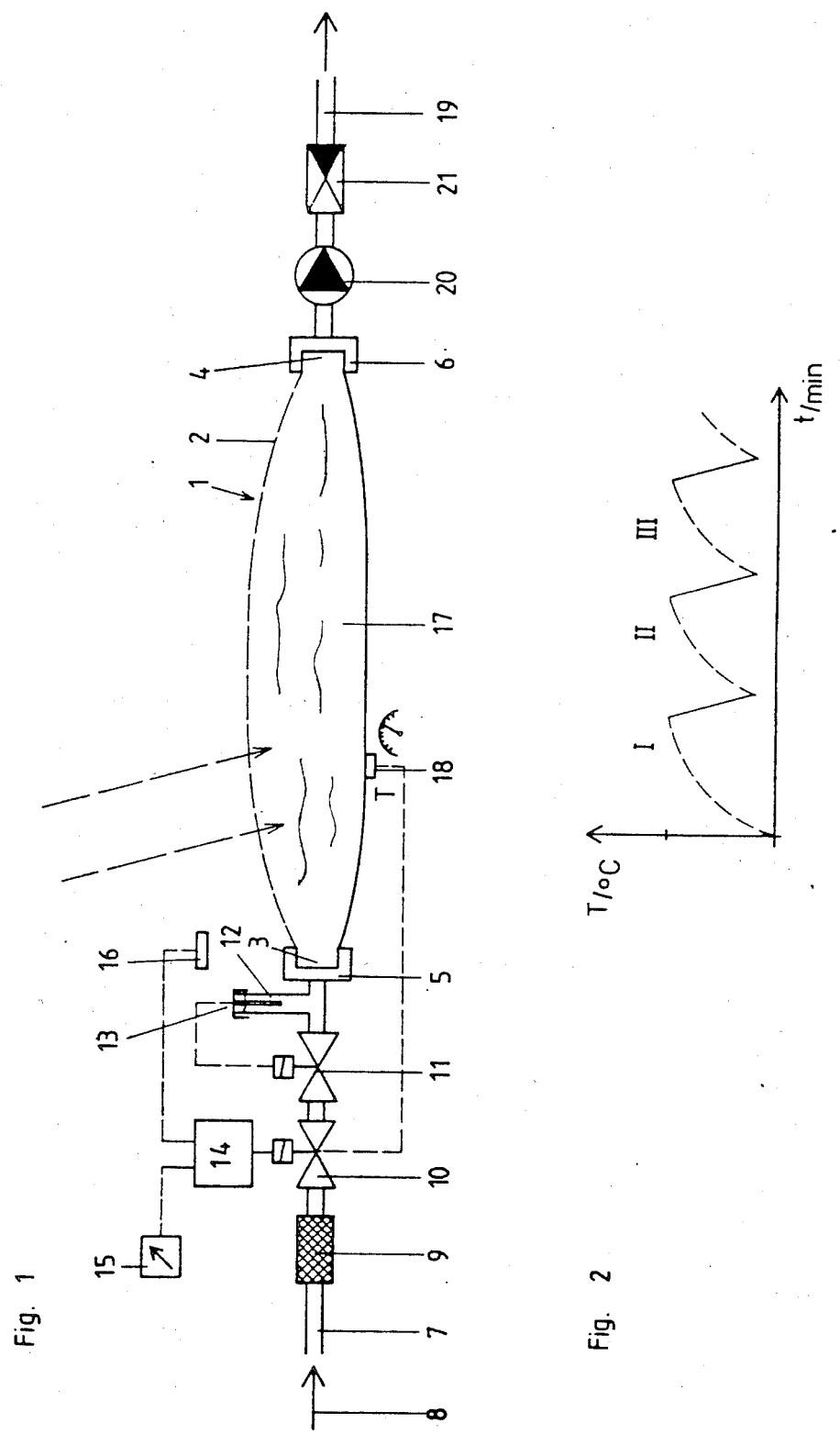

4,686,960

APPARATUS FOR HEATING WATER BY SOLAR ENERGY

FIELD OF THE INVENTION

The invention is directed to an apparatus for heating houshold or commercial water by solar energy, including a container for the water made from plastic sheeting, a cold water inlet opening preceded by an inlet valve, and a tap opening; the top of the container is transparent and the bottom is dark in color.

BACKGROUND OF THE INVENTION

An apparatus of this type is known from U.S. Pat. No. 3,052,228. In the known apparatus, the water level can be adjusted manually using an adjusting device. On the outlet side, only a faucet is provided, which enables the emptying of the container under the influence of the gravitational force of the heated water located in it.

The known apparatus may be adequate for certain applications, such as in camping. It is inadequate, however, for meeting the need for large quantities of hot water to be supplied to household water systems, and so cannot provide a true alternative to conventional hot water systems.

SUMMARY OF THE INVENTION

It is accordingly the object of the present invention to embody an apparatus of the above type such that it can meet commercial needs and also satisfy stringent requirements for operational reliability, efficiency and compatibility with existing systems.

This object is attained by providing that the outlet opening is followed by a pump and a check valve, that the inlet valve is actuatable electromagnetically, and that a sensor for measuring the instantaneous water temperature and an adjusting device for adjusting the desired water temperature are connected to the inlet valve. The greater the intensity of the incident sunlight, the more cold water the inlet valve admits into the container.

With this embodiment according to the invention, water can be furnished at a desired temperature, and in particular, if the incident sunlight is weak, an excessively long time is no longer needed, after a relatively large amount of water has been drawn, before water at the desired temperature is again available. The pump provided on the outlet side in accordance with the invention, combined with the check valve, also enables the feeding of water into a hot-water supply network that is under pressure. Thus an apparatus according to the invention, in an appropriate size for the local climate, is suitable for supplying part or all of the hot water needed by car-wash operations, hotels, restaurants and the like.

In accordance with the invention, it can also be provided that the tap opening is a flexible hose leading into the interior of the container, its free end being joined to a float in such a way that the hose opening rests just below the surface of the water in the container. As a result, water is always withdrawn from near the surface only. Because warmer water has a lower density, and the attendant temperature distribution of the water in the container, this water near the surface is always warmer than the water near the bottom.

A further advantageous feature of the invention provides that a ventilation hose extending in a sealing manner to the outside is disposed in the container, and the free opening of the hose is joined to a float in such a way that it rests somewhat above the surface of the water in the container. In this way, reliable ventilation and hence the avoidance of overpressure are assured, yet water cannot escape to the outside if the container sheeting is subjected to pressure. The formation of calcium deposits, which would impair the transparency of the container, can thus be precluded as well.

The ends of the container are favorably embodied as rigid, relatively flat end panels with fastening devices for the plastic sheeting. Various devices such as switches or the like can be attached to such end panels. At the same time, end panels of this kind enable the fabrications of containers of arbitrary length from an endless tube of sheeting. The fastening devices are favorably in the form of clamping strips, which can be produced from plastic and enable a watertight fixation of the plastic tube.

Furthermore, the inlet and outlet openings are embodied in the end panels, in the form of horizontal slits. In this manner the temperature stratification in the container, which is exploited by the invention, is not disturbed when water flows in and out, because a predominantly laminar flow pattern is attained.

In a particularly advantageous feature, a fill level limit switch, which stops the inflow of cold water no later than when a certain maximum fill level has been reached, is arranged for instance in one end panel.

To prevent heat loss due to radiation from the container and to avoid cooling caused by wind, an ultraviolet-transparent covering can be provided for the container. Because of this ultraviolet transparency, not only is the available spectrum of incident sunlight optimally utilized, but the ultraviolet rays reaching the water also have a germicidal effect, so that the water intended for consumption is largely disinfected.

Depending on the geographic location and the climatic conditions to be expected there, it may be provided that the covering includes a plurality of layers of transparent film or sheeting, so as to avoid convection and an attendant cooling. With such a multi-layered embodiment in particular, it is provided that the sheets of the covering are held taut by a frame.

An alternative possibility in embodying the covering is for it to be self-supporting; that is, the covering is inherently largely self contained and is inflated by a pump. In this case, the covering can be made to rest on the container by switching off the pump appropriately. This is favorable if the apparatus according to the invention is used as an absorber for a heat pump.

It has been found that the use of cobalt blue for the dark underside of the tube of sheeting from which the container is formed not only makes it possible to attain an attractive apparatus esthetically, but furthermore provides very good absorption.

With the construction according to the invention, it is possible to dispose catch grooves in the interior of the container leading outward along the container wall above the surface of the water. These grooves catch condensed water, so that this water, which is highly pure and practically distilled, can be drawn off and used for purposes where such water is needed. In this embodiment, by blowing air into the container or by embodying the container as self-supporting, combined with an appropriate fill level control, it is assured that an adequate cushion of air always remains above the surface of the water.

An apparatus according to the invention includes various hydraulic components, as well as electric switches and adjusting and display devices. In using closed-loop and open-loop control devices of the type in question for furnishing hot water by means of solar collectors, it must be understood that conditions in technologically underdeveloped countries must be taken into account. This means that assembly and servicing must be easy to perform, and that good protection must be provided against unfavorable environmental conditions, such as high heat.

In accordance with the invention, therefore, an open- and closed-loop control device is provided, the housing of which comprises two injection molded shells having complementary molded recesses, such that when the two shells are joined, lines for the fluid medium are created in between functional devices such as valves, pumps and the like which can be placed into corresponding molded recesses.

Embodying the apparatus according to the invention enables rapid, simple, mistake-free, economical assembly, because aside from the outer housing shells no internal retaining means have to be provided and no connections need to be made using screws, clamps or the like. The position of the individual components is automatically specified by the molded recesses that are created, so that assembly can be done by persons without specialized skills as well. Finally, pipe connections need not be provided at all, because the fluid lines are embodied in the housing shells themselves.

A further substantial advantage of the construction according to the invention is that the two shells, each being in one piece, are very sturdy and accordingly serve as an impact-damping means for the parts housed in them. A thermal insulation is furthermore attained, so that electrical units, in particular, which are housed in the shells are protected from intensive sunlight. Finally, a closed- and open-loop control device of this kind can be extremely compact and space-saving in structure, and all the essential elements can be accommodated and protected within one and the same housing.

Sealing cords can advantageously be inlaid between the shells, along the molded recesses, thereby attaining reliable sealing of the fluid lines.

Alternatively, sealing masks with cutouts corresponding to the molded recesses can be inserted between the shells.

Finally, it can also be provided according to the invention that annular grooves are disposed at the ends of the molded recesses for the insertion of seals at right angles to the plane of separation of the shells. These seals can be used to furnish a sealed connection between parts such as pumps or valves that are inserted into the molded recesses.

Further characteristics, advantages and details of the invention will become apparent from the ensuing description of a preferred exemplary embodiment, taken in conjunction with the drawing.

BRIEF DESCRIPTION OF THE DRAWINGS

FIG. 1 is a schematic side view, on the order of a circuit diagram, of an apparatus according to the invention;

FIG. 2 is a graph showing the course of temperature as a function of time and as a function of withdrawals of water;

DESCRIPTION OF THE PREFERRED EMBODIMENT

Figure 3:
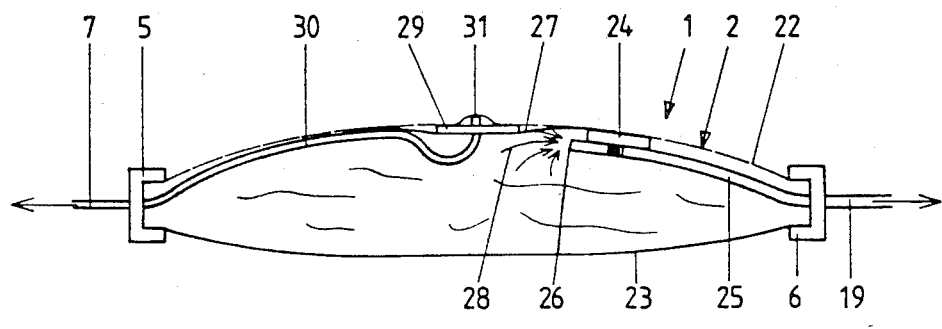
FIG. 3 is a schematic sectional view of the container of the apparatus according to the invention, having withdrawal and ventilating devices.
Figure 4:
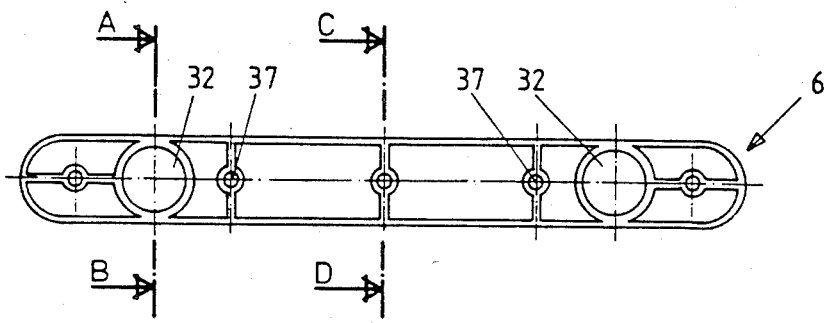
FIG. 4 is a view of an end panel according to the invention for the container, seen from outside.
Figure 5:
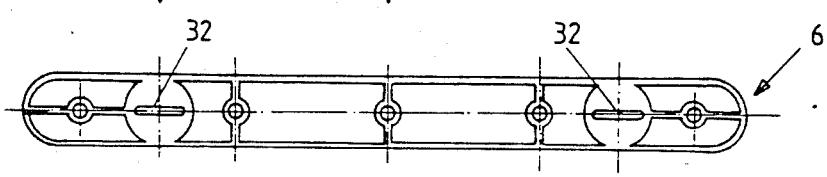
FIG. 5 is a view corresponding to FIG. 4, seen from the inside.

The apparatus shown in FIG. 1 includes a container 1, which is embodied by an endlessly extruded film or sheet tube 2, the openings 3 and 4 of which are closed off by respective end panels 5 and 6.

A filter 9 is disposed in the feed line 7, in which cold water flows in in the direction of the arrow 8, and the filter 9 is followed by two electromagnetically actuatable valves 10, 11. The valve 11 is controlled with a limit switch 13, not shown in further detail, in accordance with a fill level measuring device 12 in such a way that a certain maximal fill level is not exceeded.

The valve 10 is actuated in accordance with an open- and closed-loop control device 14, which is connected to an adjusting device 15 for setting the desired water temperature and to a measuring device 16 for the instantaneous intensity of incident sunlight and functions in such a way that regardless of the maximal fill level determined by the valve 11, the fill level will be measured such that the lower the instantaneous water temperature, or the higher the desired temperature of the water to be supplied, the lower the fill level will be. The actual temperature of the water 17 in the container 1 at any time is detected by means of a sensor 18, which is connected to the open- and closed-loop control device. Since this actual temperature practically corresponds to the integral of the incident sunlight, the fill level is regulated in the simplest case in accordance with this temperature.

Following the end panel 6 is an outlet line 19 having a pump 20 and a check valve 21. By combining the pump 20 or the check valve 21 with the fill level regulating means provided, it becomes possible to use the apparatus according to the invention to great advantage for supplying water even to relatively large consumers, such as car-wash operations, hotels and the like, because at the predetermined supply water temperature it becomes possible to feed water into the hot-water supply network, which as a rule is at a higher pressure.

In FIG. 2, the course of the temperature T is plotted in accordance with the time t for various water-withdrawing cycles I, II and III.

FIG. 3 is a schematic view of the container 1 without any supplementary equipment. The top 22 of the sheet or film tube 2 is shown in broken lines, because it is embodied as transparent, while the bottom 23 of the tube 2 is coated with an opaque color, preferably cobalt blue. To enable providing this coating, the surface of the tube 2 is roughened in this region by electro-etching, to assure reliable adhesion of the paint.

A first float 24 is connected to a flexible hose 25, which is connected in turn to the outlet line 19 via the end panel 6. The float 24 keeps the free opening 26 of the hose 25 just below the surface 27 of the water 17 in the container 1, so that when water is withdrawn it can flow out in the direction of the arrows 28. This assures that the temperature stratification of the water 17 in the container 1 will be exploited in such a way that as much as possible, water will be withdrawn from the warmer zones.

A further float 29 is connected to a further flexible hose 30, and the free end 31 of the hose 30 protrudes beyond the float 29 in such a way that ventilation can be effected through this end 31 of the hose 30. The hose 30 is extended to the outside through the end panel 5. This assures reliable ventilation, without necessitating the provision of an opening in the film or sheet tube 2 itself.

FIGS. 4–7 show views of one end panel, for instance the end panel 6. From FIG. 5, it is clear that toward the inside of the container 1, the withdrawal openings 32 communicating with the line 19 are embodied as horizontal slits 33, which toward the outside widen out into openings 34 of round cross section. The geometry of the slits enables not only a stratified, laminar withdrawal but also the feeding in of cold water.

Figure 6:
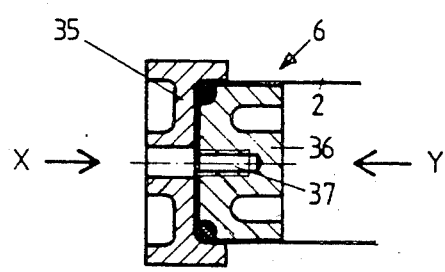
FIG. 6 is a section taken along the line C-D of FIG. 4.
Figure 7:
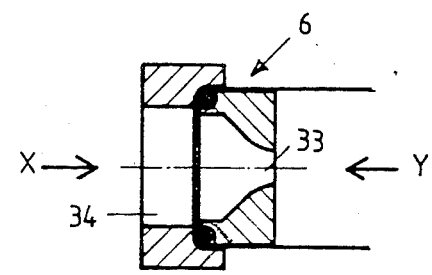
FIG. 7 is a section taken along the line A-B of FIG. 4.

From FIGS. 6 and 7, it is also apparent that the end panel 6 comprises two profile strips 35, 36, between which the film or sheet tube 2 is fastened. The fastening is effected by means of a plurality of screw assemblies 37.

Figure 8:
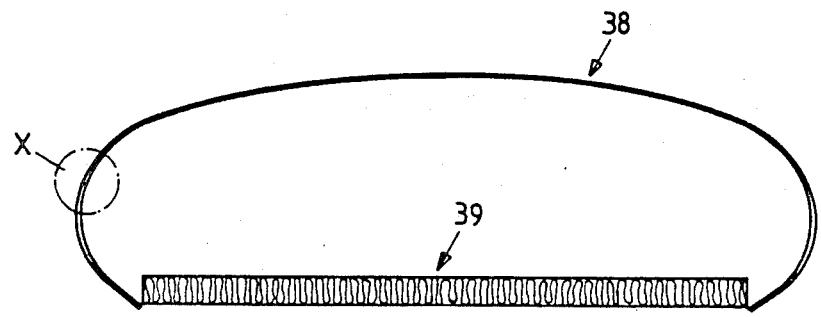
FIG. 8 is a schematic sectional view taken through a covering for an apparatus according to the invention.
Figure 9:
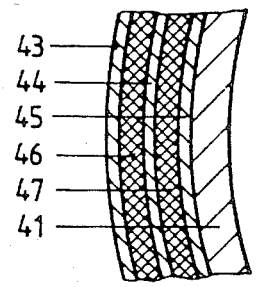
FIG. 9 is an enlarged fragmentary sectional view of the area marked X in FIG. 8.
Figure 10:
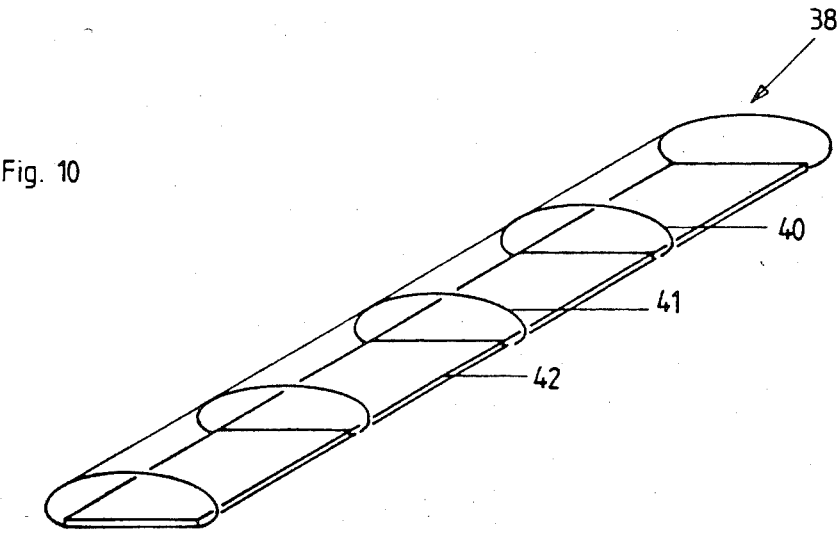
FIG. 10 shows a covering according to FIG. 8, for a container of greater length.

FIGS. 8–10 show a covering 38 for the container 1 which is intended to prevent cooling of the heated water in the container due to air movement and convection. The underside of the covering is connected to a heat insulating layer 39 toward the contact surface. The top of the covering 38 is constructed of one or a plurality of films or sheets, which are transparent to both visible and ultraviolet light and are fastened via a supporting frame 40 shown only schematically. The supporting frame 40 includes a plurality of arched carriers 41, which are joined together by struts 42.

FIG. 9 shows the structure of the covering 38 in a fragmentary detail X in the vicinity of a carrier 41. In the exemplary embodiment shown, three sheets or films 43, 44, 45 extending parallel to one another are provided, which are tentered by the carrier 41 and are kept spaced apart from one another by rubber cords 46, 47. Without departing from the scope of the invention, an appropriate number of sheets or films can be layered on one another in accordance with the climate where the apparatus is to be used, without requiring any modification whatever of the basic structure.

Figure 13:
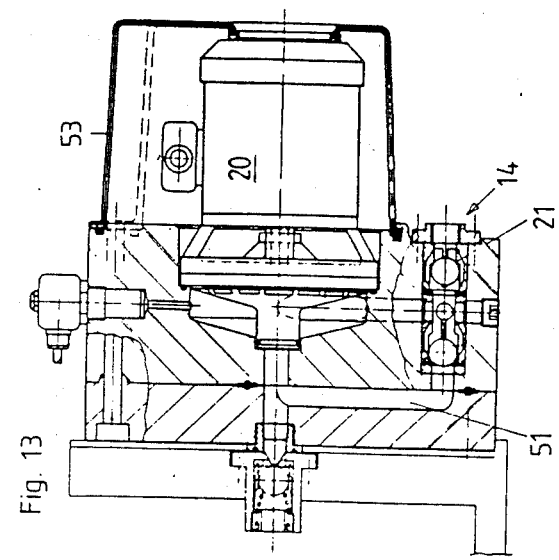
FIGS. 11-13 are fragmentary sectional views of the open- and closed-loop control device of the apparatus according to the invention.
Figure 11:
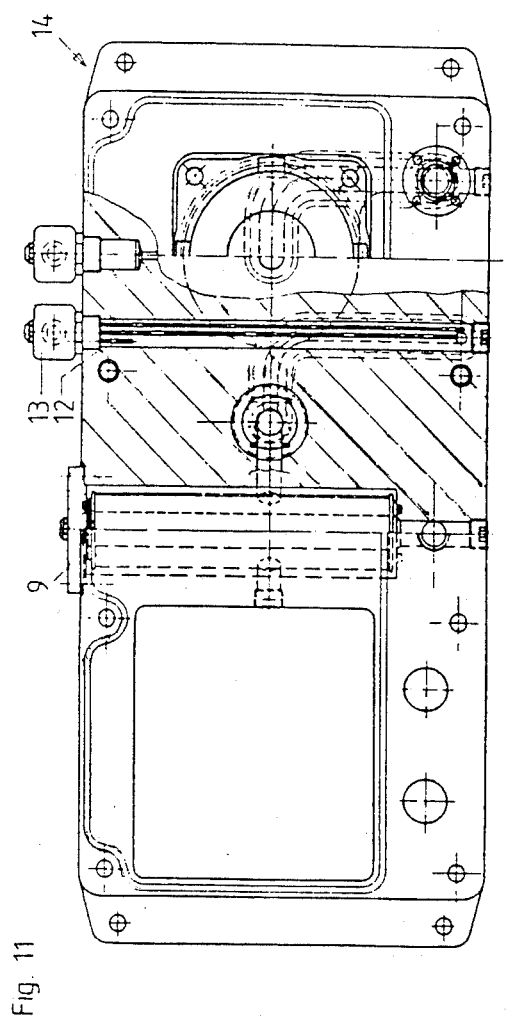
Figure 12:
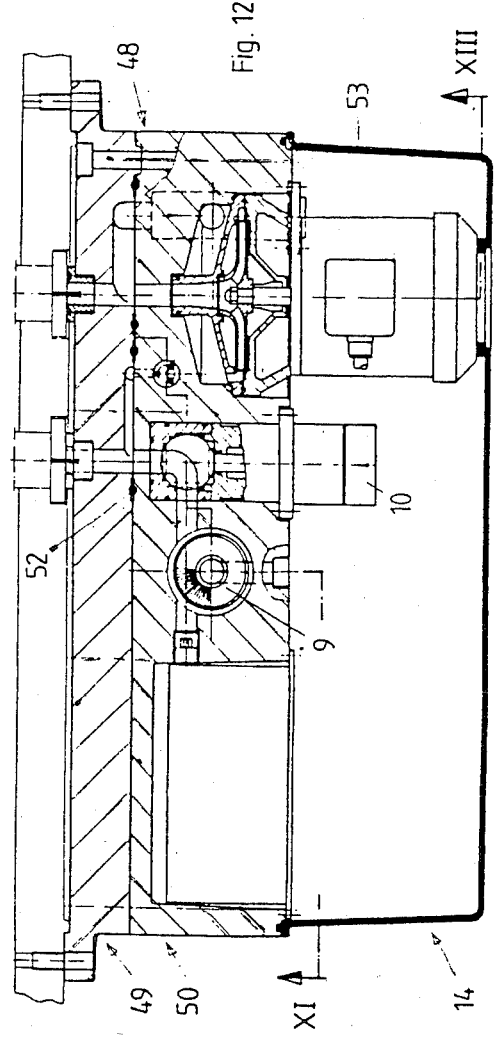

In FIGS. 11–13, an open- and closed-loop control device according to the invention is shown. The essential feature of this device is that the housing 48 comprises two shells 49 and 50, each of which is produced in one piece by injection molding. Each shell has a plurality of molded recesses, such that when the two shells 49, 50 are joined, recesses for receiving the various units, such as the pump 20, are produced, and that fluid lines joining the various units, such as the line 51, are created at the same time. Sealing cords 52 are inlaid between the shells 49, 50 in order to separate various molded recesses from one another in a sealed manner.

What is attained as a result is not only a particularly simple manufacture, but also economical assembly, and furthermore a reliable barrier against temperature fluctuations and impacts is attained. An additional covering 53 may also be provided to protect the units that protrude beyond the shells 49, 50.

The closed- and open-loop device 14 according to the invention includes all the measuring and adjustment devices as well as electrical and hydraulic assemblies, so that this device 14 can be furnished independently of the particular embodiment and size of the container 1; all that needs to be done is to adapt the device in terms of the size of the pump and the like.

It will be obvious to those skilled in the art that various chamnges may be made without departing from the scope of the invention and the invention is not to be considered limited to what is shown in the drawings and described in the specification.

What is claimed is:

1. An apparatus for heating water by solar energy, including a container, having a top and a bottom, for the water to be supplied to consumers, made from a film or sheet of plastic, having a cold water inlet opening and an electromagnetically actuable first inlet valve upstream of said cold water inlet opening and having a withdrawal opening, wherein the top of the container is transparent and the bottom is dark in color, the withdrawal opening being upstream from a pump and a check valve, a sensor for measuring the instantaneous water temperature and an adjusting device for adjusting the desired temperature of the water to be supplied each being connected to the inlet valve, the first inlet valve admitting more water into the container the higher the instantaneous water temperature is, wherein a ventilation hose extended in a sealing manner to the outside is disposed in the container, an opening of a free end of the ventilation hose being connected to a float in such a way that said opening of said ventilation hose rests somewhat above the surface of the water in the container.

2. An apparatus as defined by claim 1, wherein the withdrawal opening is downstream of a flexible hose leading into the interior of the container, a free end of the hose being connected to a float in such a way that an opening defined by the free end of said hose rests just below the surface of the water in the container.

3. An apparatus as defined by claim 1, wherein ends of the container are embodied by rigid, relatively flat end panels having a fastening device for the plastic foil or sheet.

4. An apparatus as defined by claim 3, wherein the fastening devices are embodied by clamping strips.

5. An apparatus as defined by claim 3, wherein the inlet and outlet openings, which are embodied as horizontal slits, are disposed in the end panels.

6. An apparatus as defined by claim 3, wherein a fill level limit switch for limiting the maximum level of water within said container is provided within said container and is connected to a second inlet valve upstream of said container, said fill level limit switch closing said second inlet valve when said maximum level of water is achieved.

7. An apparatus as defined by claim 1, wherein the container is spanned by a covering that is transparent to ultraviolet light.

8. An apparatus as defined by claim 7, wherein the covering comprises a plastic film or sheet fastened via on a frame.

9. An apparatus as defined by claim 8, wherein a plurality of layers of film or sheeting are fastened in the frame.

10. An apparatus as defined by claim 9, wherein the covering is supported by an internal overpressure.

11. An apparatus as defined by claim 1, wherein the dark bottom of the film or sheet tube is colored cobalt blue.

12. An apparatus for heating water by solar energy, including a container, having a top and a bottom, for the water to be supplied to consumers, made from a film or sheet of plastic, having a cold water inlet opening, an electromagnetically actuable inlet valve upstream of said cold water inlet opening, and having a withdrawal opening, wherein the top of the container is transparent and the bottom is dark in color, the withdrawal opening being upstream from a pump and a check valve, a sensor for measuring the instantaneous water temperature and an adjusting device for adjusting the desired temperature of the water to be supplied each being connected to the inlet valve, the inlet valve admitting more water into the container the higher the instantaneous water temperature is, said pump and said inlet valve being joined by fluid lines and further comprising a housing surrounding said pump and said inlet valve, wherein the housing comprises two injection molded shells, complementary molded recesses being embodied in the shells in such a manner that when the shells are joined, corresponding molded recesses, into which said fluid lines may be inserted, are created.

13. An apparatus as defined by claim 12, wherein sealing cords are inlaid between the shells, along the molded recesses.

14. An apparatus as defined by claim 12, wherein a sealing mask with cutouts matching the molded recesses is inlaid between the shells.

15. An apparatus as defined by claim 12, wherein annular grooves are disposed on the ends of the molded recesses at right angles to a plane of separation of the shells, for the insertion of seals.

* * * * *